US010506619B2

United States Patent
Chung et al.

(10) Patent No.: US 10,506,619 B2
(45) Date of Patent: Dec. 10, 2019

(54) SCHEDULING APPARATUS AND METHOD USING VIRTUAL SLOT FRAME IN INDUSTRIAL WIRELESS NETWORK

(71) Applicant: Pusan National University Industry-University Cooperation Foundation, Busan (KR)

(72) Inventors: Sanghwa Chung, Seoul (KR); Yuvin Ha, Seoul (KR)

(73) Assignee: Pusan National University Industry—University Cooperation Foundation, Busan (KR)

( * ) Notice: Subject to any disclaimer, the term of this patent is extended or adjusted under 35 U.S.C. 154(b) by 84 days.

(21) Appl. No.: 15/961,743

(22) Filed: Apr. 24, 2018

(65) Prior Publication Data

US 2019/0230678 A1 Jul. 25, 2019

(30) Foreign Application Priority Data

Jan. 19, 2018 (KR) .................... 10-2018-0007274

(51) Int. Cl.
*H04W 72/12* (2009.01)
*H04W 4/80* (2018.01)
(Continued)

(52) U.S. Cl.
CPC ......... *H04W 72/1205* (2013.01); *H04W 4/80* (2018.02); *H04W 72/1221* (2013.01);
(Continued)

(58) Field of Classification Search
CPC ............... H04W 4/80; H04W 72/0446; H04W 72/1205; H04W 84/12; H04W 4/70;
(Continued)

(56) References Cited

U.S. PATENT DOCUMENTS

2016/0021011 A1* 1/2016 Vasseur ................. H04L 47/127
370/235
2017/0289847 A1* 10/2017 Wetterwald ........... H04L 5/0055
2019/0182854 A1* 6/2019 Chen ................. H04W 72/1242

FOREIGN PATENT DOCUMENTS

KR 10-2012-0043359 A 5/2012
KR 10-1527151 B1 6/2015
(Continued)

OTHER PUBLICATIONS

Korean Office Action dated Apr. 23, 2018.
Korean Notice of Allowance dated Jul. 17, 2018.

*Primary Examiner* — Awet Haile
(74) *Attorney, Agent, or Firm* — Rabin & Berdo, P.C.

(57) ABSTRACT

Disclosed are a scheduling apparatus and method using a virtual slotframe in an industrial wireless sensor network in which devices on the network generate schedules that are efficient with regard to data traffic having various cycles by performing scheduling in a distributed manner through a virtual slotframe scheme, the scheduling apparatus and method including a packet classifier configured to manage, in a list, a point in time when a packet was generated by referring to a packet transmission record, a transmission record analyzer configured to analyze a traffic pattern on the basis of a list indicating the point in time when the packet was generated, a virtual slotframe schedule generation manager configured to generate a virtual slotframe schedule according to the traffic pattern when the traffic pattern is classified, and a schedule converter and aggregator configured to perform a conversion and an aggregation for a direct link schedule to be used for TSCH (Time Slotted Channel Hopping) operation.

13 Claims, 5 Drawing Sheets

(51) Int. Cl.
 *H04W 72/04* (2009.01)
 *H04W 84/12* (2009.01)
 *H04W 84/18* (2009.01)

(52) U.S. Cl.
 CPC ........ *H04W 72/0446* (2013.01); *H04W 84/12* (2013.01); *H04W 84/18* (2013.01)

(58) Field of Classification Search
 CPC ......... H04W 4/40; H04W 4/38; H04W 84/18; H04W 8/005; H04W 12/08; H04W 24/08; H04W 12/009; H04W 28/02; H04W 4/02; H04W 4/029; H04L 67/12; H04L 67/10; H04L 67/125; H04L 43/08; H04L 67/2833; H04L 29/08531; H04L 41/5041; H04L 43/0876; H04L 45/38
 See application file for complete search history.

(56) References Cited

FOREIGN PATENT DOCUMENTS

KR   10-2017-0048937 A   5/2017
KR   10-1882425 B1   7/2018

\* cited by examiner

SCHEDULING APPARATUS AND METHOD USING VIRTUAL SLOT FRAME IN INDUSTRIAL WIRELESS NETWORK

TECHNICAL FIELD

The present invention relates to an industrial wireless sensor network, and more particularly, to a scheduling apparatus and method using a virtual slotframe in an industrial wireless sensor network in which devices on a network generate schedules that are efficient with regard to data traffic having various cycles by performing scheduling in a distributed manner through a virtual slotframe scheme.

BACKGROUND ART

Time Slotted Channel Hopping (TSCH) MAC (Media Access Control) technology is a MAC technology included in an IEEE 802.15.4e MAC amendment, and is a standard technology for industrial wireless sensor networks, such as WirelessHART and ISA100.11a, that provide a high level of reliability and stability.

Devices joining a TSCH network are synchronized by time, and operate based on time, that is, in units of timeslots, and a plurality of timeslots are grouped to constitute a slotframe.

The length of a slotframe represents the number of timeslots constituting the slotframe, and the slotframes are periodically repeated during an operation time. For a single timeslot, TSCH network devices select one of a sleep operation, a transmit operation, and a receive operation, and continuously change the frequency to be used in each timeslot through a channel hopping scheme.

As described above, TSCH MAC is a multi-channel utilization technology based on Time Division Multiple Access (TDMA), and for transmission and reception, it is required to determine a channel and a timeslot (a point in time) in which a communication is to be performed.

Such an issue is referred to as TSCH link scheduling, and is an essential technique for realizing a high level of reliability and stability in TSCH MAC.

Link scheduling is performed in units of slotframes that are periodically repeated, and is achieved by allocating a link, in which a slot offset slotOffset is a relative time within the slot frame and a channel offset channelOffset is an index of an available channel list, between two devices.

The two devices are able to stably communicate with each other by using a time and a channel designated at the allocated link slotOffset and channelOffset.

However, the IEEE 802.15.4e standard, which defines the TSCH mechanism, does not define the scheduling method.

Virtual slotframe technology is a technology of combining a plurality of slotframes to constitute a virtual logical slotframe, which allows each device to use more resources without changing the length of an actual slotframe.

When the length of the slotframe, which corresponds to TSCH network settings, is changed, the changed setting generates a large amount of overhead until the changed setting is applied to the whole network, and may cause network interruption.

In the industrial field, smartfactories, manufacturing process intellectualization, and so on are of great interest, and an IIoT (Industrial Internet of Things) technology for industry is drawing attention as a new trend.

In IIoT, a sensor network device for transmitting temperature, and vibration of a device, and so on is also expected to perform various functions, such as sensing a movement of an operator and reporting the movement together. That is, a single device transmits data for various application services, and each piece of application service data is provided with a unique traffic pattern.

IEEE 802.15.4e TSCH MAC technology for IIoT provides a high reliability and stability due to Time Slotted Access and Channel Hopping characteristics.

However, in the standards, the link scheduling technology for IIoT is not clearly defined. Link scheduling technologies, which have been proposed to solve the above limitations, operate considering only a traffic pattern of a single application service or assuming only convergecast in which traffic converges from devices to a server.

In particular, link scheduling performed on a slotframe having a fixed length has difficulty in efficiently handling various traffic patterns that are generated from a plurality of application services.

For example, under the assumption that an application service A that transmits data at a cycle of 1 second and an application server B that transmits data at a cycle of 10 seconds, when the length of the slot frame is adjusted to the application service A, there is a need to allocate a link to each slotframe for the application service B, that is, to allocate an additional link to each slotframe for the data, which is transmitted every 10 seconds, and thus energy is constantly wasted.

When the length of the slot frame is adjusted to the application service B, there is a need to generate a plurality of schedules for the application service A, thereby resulting in waste of memory.

An increasing gap between traffic patterns in respective application services may lead to the worsening of the problem discussed above, and an increasing number of application services may cause a bigger problem.

RELATED ART DOCUMENT

Patent Document

Korean Registered Patent: No. 10-1527151
Korean Unexamined Patent Publication: No. 10-2012-0043359

DISCLOSURE

Technical Problem

The present invention has been made to solve problems with scheduling technology in an industrial wireless sensor network, and the present invention is directed to providing a scheduling apparatus and method using a virtual slotframe in an industrial wireless sensor network in which devices on a network perform scheduling in a distributed manner through a virtual slotframe scheme so as to generate schedules that are efficient with regard to data traffic having various cycles.

The present invention is directed to providing a scheduling apparatus and method using a virtual slotframe in an industrial wireless sensor network, capable of organizing a virtual slotframe suitable for various traffic patterns generated from a plurality of application services and generating a link schedule adaptive to each traffic pattern.

Through virtual slotframe technology, the present invention is directed to providing a scheduling apparatus and method using a virtual slotframe in an industrial wireless sensor network, capable of obviating the need to consider an influence on the whole network, and allowing link scheduling to be performed at an appropriate slotframe level that is required by each application service.

The present invention is directed to providing a scheduling apparatus and method using a virtual slotframe in an industrial wireless sensor network, enabling data transmission with a significantly low latency by applying a schedule to the data transmission at a point in time when a link is needed by adaptively responding to a traffic pattern generated from each application service.

The present invention is directed to providing a scheduling apparatus and method using a virtual slotframe in an industrial wireless sensor network, capable of providing adaptive performance not only for uplink traffic and downlink traffic but also for periodic and non-periodic traffic.

The present invention is directed to providing a scheduling apparatus and method using a virtual slotframe in an industrial wireless sensor network, capable of reducing control overhead needed for scheduling by allowing each network device to perform link scheduling in a distributed manner.

The present invention is directed to providing a scheduling apparatus and method using a virtual slotframe in an industrial wireless sensor network, which operates in the standards based on IEEE standard 802.15.4-2015 and IETF 6TiSCH RFC, so that a wide availability is ensured without violating the standards.

The technical objectives of the present invention are not limited to those disclosed above, and other objectives may become apparent to those of ordinary skill in the art on the basis of the following description.

Technical Solution

One aspect of the present invention provides a scheduling apparatus using a virtual slotframe in an industrial wireless sensor network, the scheduling apparatus including: a packet classifier configured to manage, in a list, a point in time when a packet was generated by referring to a packet transmission record; a transmission record analyzer configured to analyze a traffic pattern on the basis of a list indicating the point in time when the packet was generated; a virtual slotframe schedule generation manager configured to generate a virtual slotframe schedule according to the traffic pattern when the traffic pattern is classified; and a schedule converter and aggregator configured to perform a conversion and an aggregation for a direct link schedule that is to be used for TSCH (Time Slotted Channel Hopping) operation.

The scheduling apparatus may further include a packet selector configured to select a packet when a time of transmission approaches according to the link schedule, and perform a transmission on the selected packet.

The scheduling apparatus may further include a packet reception predictor configured to predict a reception time of the packet through the analyzed traffic pattern and deliver the predicted reception time of the packet to the virtual slotframe schedule generation manager, wherein the packet reception predictor increases a prediction accuracy value or corrects a wrong prediction based on elapsed time.

When the traffic pattern is successfully classified, the virtual slotframe schedule generation manager may generate a virtual slotframe schedule that is suitable for a traffic pattern, and negotiates for the link schedule with a target device through a 6Top layer.

The schedule converter and aggregator may manage, in a table, the virtual slotframe schedule that is generated through the negotiation with the target device.

Another aspect of the present invention provides a scheduling method using a virtual slotframe in an industrial wireless sensor network, the scheduling method including: adding details to a packet transmission record list when a packet is received by a TSCH (Time Slotted Channel Hopping) layer, and analyzing a transmission cycle; analyzing, by a transmission record analyzer, a transmission record that represents a traffic pattern on the basis of the recorded list, and when a new transmission cycle is found, generating a virtual slotframe schedule on the basis of the new transmission cycle; generating a link for a virtual slotframe having a length that is suitable for the found transmission cycle, and performing a negotiation for the link with a target device through a 6Top layer; and adding the link to a virtual slotframe schedule table when the link is successfully generated.

The adding of the link to the virtual slotframe schedule table may include deleting a packet transmission record that has been used for the analysis.

The adding of the link to the virtual slotframe schedule table may include converting and aggregating, by a schedule converter and aggregator, an added virtual slotframe schedule into a TSCH link schedule that is usable in a TSCH operator at the start of each slot frame.

The scheduling method may further include a virtual slotframe schedule adjustment operation of, when a packet is received by a TSCH layer, predicting a reception time of the packet through the analyzed traffic pattern, and decreasing or increasing allocated resources on the basis of a schedule accuracy value.

The virtual slotframe schedule adjustment operation may include: predicting, by a packet reception predictor, a reception time of the packet through the traffic pattern when the packet is received by the TSCH layer, and in response to successfully predicting the reception, increasing the schedule accuracy value and determining whether the accuracy value is smaller than or equal to a maximum value; reducing the allocated resources when the accuracy value is smaller than or equal to the maximum value, and adjusting the virtual slotframe schedule; decreasing the schedule accuracy value in response to unsuccessfully predicting the reception, and determining whether the accuracy value is smaller than or equal to a minimum value; and unallocating the virtual slotframe schedule and adjusting the virtual slotframe schedule when the accuracy value is smaller than or equal to the minimum value, and increasing allocated resources and adjusting the virtual slotframe schedule when the accuracy value is not smaller than or equal to the minimum value.

When the schedule accuracy value is lowered to a predetermined threshold value or below, the virtual slotframe schedule may be discarded, and a traffic pattern is newly predicted.

The adding of the link to the virtual slotframe schedule table may include converting and aggregating, by a schedule conversion and aggregator, an added virtual slotframe schedule into a TSCH link schedule that is usable in a TSCH operator at the start of each slot frame.

Traffic of which a pattern is not analyzed by the transmission record analyzer or traffic in which a loss occurs due to duplication may be transmitted through an additional schedule, and the transmission record analyzer may predict a total amount of traffic that has not been classified or in which a loss will occur, and generate a schedule to be classified into a basic packet queue.

Another aspect of the present invention provides a scheduling method using a virtual slotframe in an industrial wireless sensor network, the scheduling method including, for applying a virtual slotframe schedule to a TSCH (Time Slotted Channel Hopping) communication flow: initiating, by a TSCH, an operation on the basis of the start of a timeslot, and determining whether the initiation of the operation is the start of a new slotframe; performing a virtual slotframe schedule conversion when the initiation of the operation is the start of a new slotframe, and determining whether a schedule to be executed exists when the initiation of the operation is not the start of a new slotframe; performing an operation according to the schedule in a current time slot by referring to a TSCH schedule table when a schedule to be executed exists; obtaining, by a packet selector, a suitable packet by using LinkType of a TSCH schedule by referring to LinkOption of a TSCH schedule table, receiving the packet, and transmitting the packet to a TSCH operator; and updating, by the TSCH operator, a transmission result record table.

The determining of whether a schedule to be executed exists may include returning to a sleep state and waiting for the next time slot to start while reducing energy consumption when a schedule to be executed does not exist.

The operation according to the schedule to be executed may be classified as a sleep state, a transmission state, or a reception state in a LinkOption field, and while operating in the reception state, the reception of a packet is waited on, and a timeslot is finished when the reception is successful or Idle listening ends.

Advantageous Effects

The scheduling apparatus and method using a virtual slotframe in an industrial wireless sensor network according to the present invention provide the following advantageous effects.

First, through virtual slotframe technology, the present invention can obviate the need to consider an influence on the whole network by setting slotframes, and allow link scheduling to be performed at a proper slotframe level that is required by each application service.

Second, the present invention can enable data transmission with a significantly low level of latency by applying a schedule to the data transmission at a point in time when a link is needed by adaptively responding to a traffic pattern generated from each application service.

Third, the present invention can provide adaptive performance not only for uplink traffic and downlink traffic but also for periodic and non-periodic traffic.

Fourth, the present invention can reduce control overhead needed for scheduling by allowing each network device to perform link scheduling in a distributed manner.

Firth, the present invention operates on standards based on IEEE standard 802.15.4-2015 and IETF standard 6TiSCH RFC, and thus can ensure a wide availability without violating the standards.

MODES OF THE INVENTION

Hereinafter, embodiments of a scheduling apparatus and method using a virtual slotframe in an industrial wireless sensor network according to the present invention will be described with reference to the accompanying drawings.

The above and other objects, features and advantages of the scheduling apparatus and method using a virtual slotframe in an industrial wireless sensor network according to the present invention will become more apparent by describing exemplary embodiments thereof in detail with reference to the accompanying drawings.

Figure 1:
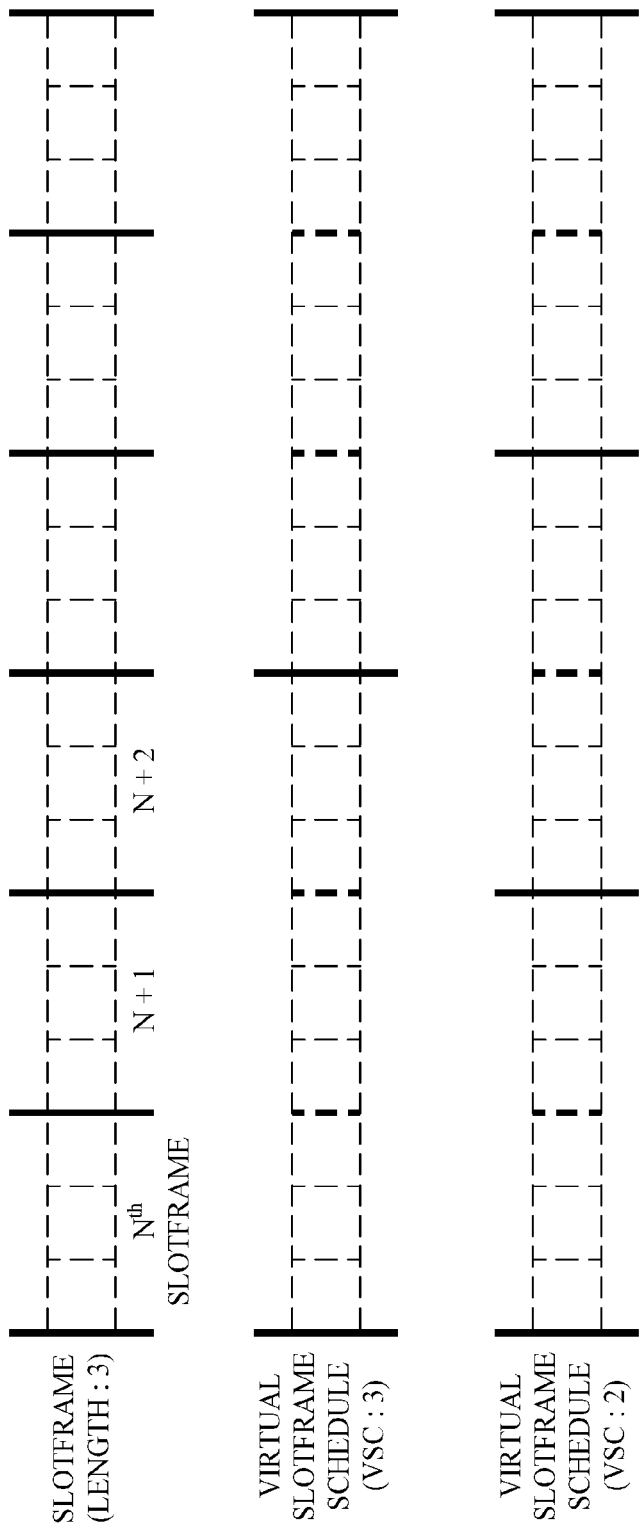
FIG. 1 is a structural view illustrating an example of a virtual slotframe.
Figure 2:
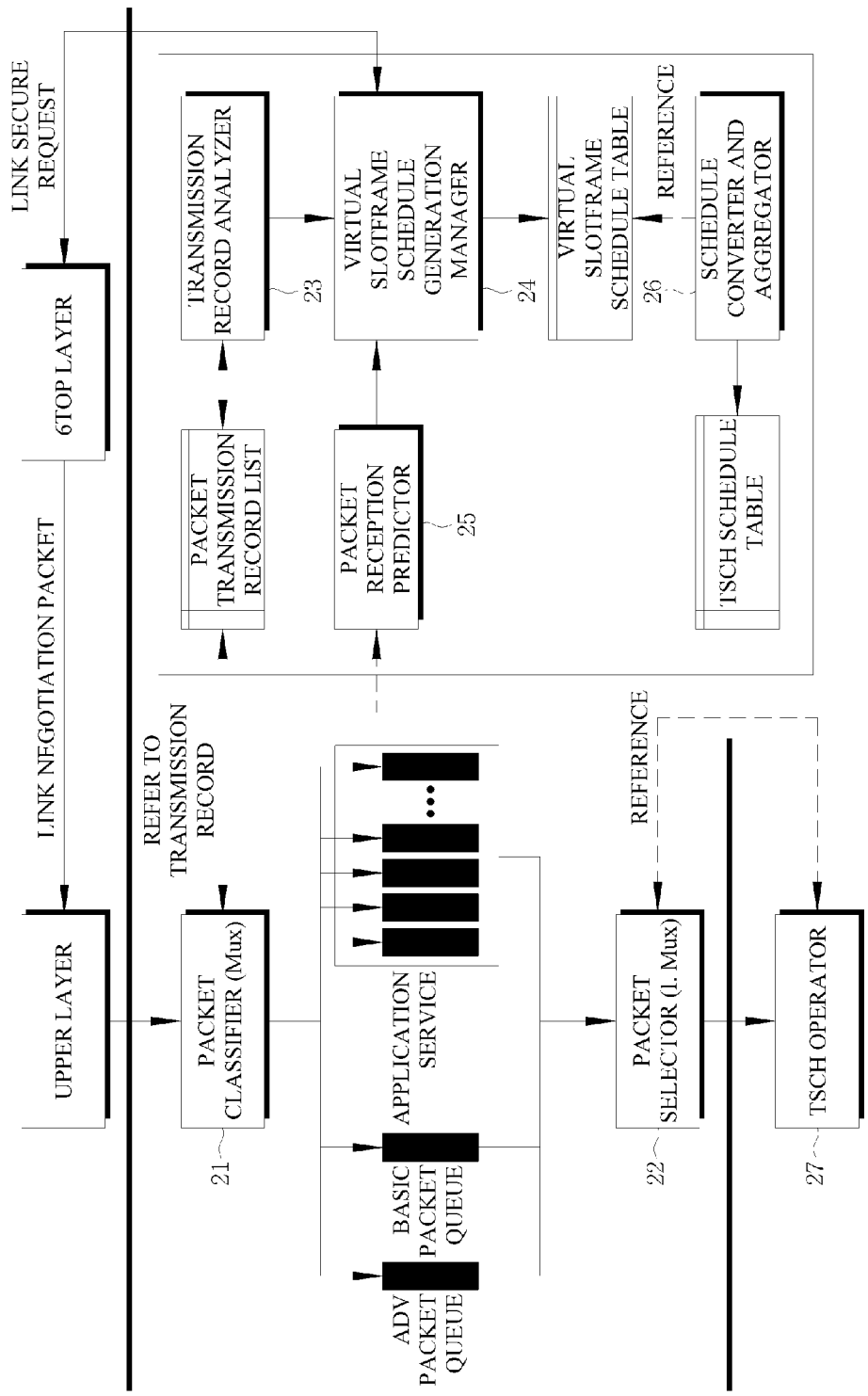
FIG. 2 is a structural view illustrating a scheduling apparatus using a virtual slot frame in an industrial wireless sensor network according to the present invention.

FIG. 1 is a structural view illustrating an example of a virtual slotframe, and FIG. 2 is a structural view illustrating a scheduling apparatus using a virtual slot frame in an industrial wireless sensor network according to the present invention.

The present invention relates to a TSCH (Time Slotted Channel Hopping) scheduling method in which, in a situation in which various application services operate on an industrial wireless sensor network device, a link schedule is adaptively generated with respect to various traffic that is generated from respective application services.

As a general example of the situation, a control signal for equipment needs to be continuously transmitted at a cycle of 0.5 seconds or less, but data with a small amount of change and a low sensitivity, such as temperature, may be transmitted at a cycle of one minute. In addition, traffic of an application service, such as sensing a movement of an operator, does not generate a pattern.

A virtual slotframe determines the number of slotframes to be handled in a group through a VSC (Virtual Slotframe Coefficient) value, and a scheduler may generate a link schedule with respect to a slotframe which is longer than an actual slotframe by using a virtual slotframe.

It is expected in IETF 6TiSCH WG (Working Group) that the reliability and stability of TSCH will be suitable for an IoT environment, and to this end, the 6Top layer is defined as facilitating setting and management of TSCH MAC.

The 6Top layer may receive a command for link allocation between devices, and set a link between one party and another party by conducting a negotiation on the basis of available resources of the two parties.

The present invention describes a method of allocating a link between devices in a distributed manner by using the link negotiation functionality of the 6Top.

The scheduling apparatus using a virtual slotframe in an industrial wireless sensor network according to the present invention has the following configuration.

Referring to FIG. 2, the scheduling apparatus includes a packet classifier 21 configured to manage a point in time when a packet was generated by referring to a packet transmission record in a list, a packet selector 22 configured to select a packet and perform a transmission on the selected packet when a time of transmission approaches according to the link schedule, a transmission record analyzer 23 configured to analyze a traffic pattern on the basis of a list indicating the point in time when the packet was generated, a packet reception predictor 25 configured to predict a reception time of the packet through the analyzed traffic pattern and deliver the predicted reception time of the packet to a virtual slotframe schedule generation manager 24 configured to generate a virtual slotframe schedule according to the traffic pattern when the traffic pattern is classified, and a schedule converter and aggregator 26 configured to manage a virtual slotframe schedule table and perform a conversion and an aggregation for a direct link schedule that is to be used by a TSCH operator 27.

A reception of the packet from an upper layer may be predicted through the predicted traffic pattern, and according elapsed time, the prediction accuracy value may be increased or a wrong prediction may be corrected.

The packet reception predictor 25 predicts a reception time of a packet through an analyzed traffic pattern and delivers the predicted reception time of the packet to the virtual slotframe schedule generation manager 24.

The packet classifier 21 allows a packet generated from the upper layer to enter an appropriate packet queue.

When a traffic pattern is successfully classified, the virtual slotframe schedule generation manager 24 generates a virtual slotframe schedule that is suitable for the traffic pattern and negotiates for a link schedule with a target device through a 6Top layer.

The schedule converter and aggregator 26 manages, in a table, the virtual slotframe schedule generated through the negotiation with the target device, and performs a conversion and an aggregation for a direct link schedule that is to be used in TSCH.

The scheduling apparatus using a virtual slotframe in an industrial wireless sensor network having the above described configuration according to the present invention performs the following scheduling operation.

In a general TSCH, the packet classifier (MUX) 21 allows a packet generated from an upper layer to enter an appropriate packet queue, and when a time of transmission approaches according to the link schedule, the packet selector (I.MUX) 22 selects an appropriate packet and performs a transmission on the selected packet.

Here, the packet classifier 21 manages points in time when packets were generated by referring to a packet transmission record in a list, and the transmission record analyzer 23 analyzes a traffic pattern on the basis of the list containing the generation times of packets.

When the traffic pattern is successfully classified, the virtual slotframe schedule generation manager 24 generates a virtual slotframe schedule that is suitable for the traffic pattern and negotiates for a link schedule with a target device through the 6Top layer.

The virtual slotframe schedule generated through the negotiation with the target device is managed in a table, and the schedule converter and aggregator 26 converts and aggregates the virtual slotframe schedule into a direct link schedule that is to be used in the TSCH.

A method for generation and management of a virtual slotframe schedule according to the present invention is described below in detail.

Figure 3:
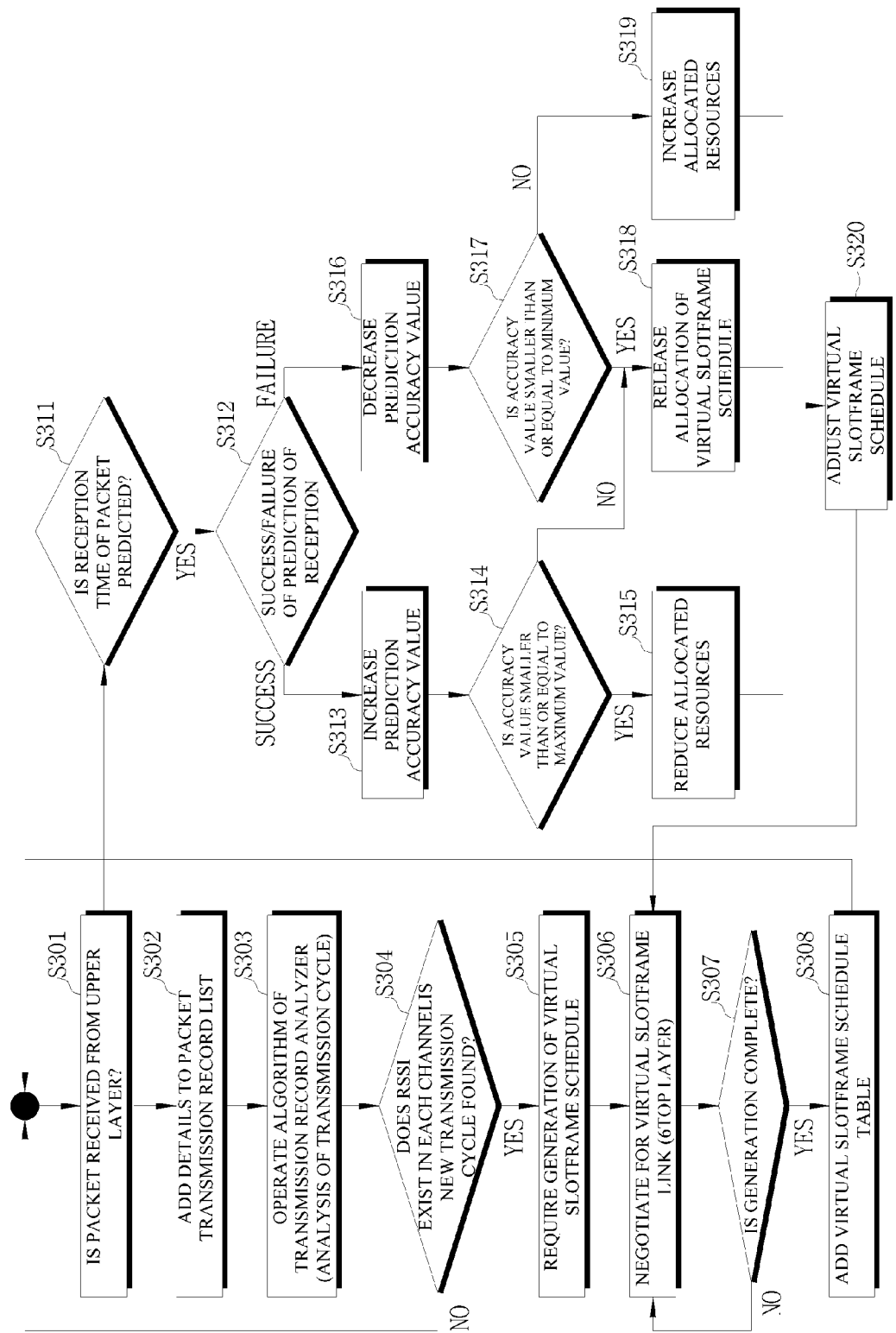
FIG. 3 is a flowchart showing a method for generation and management of a virtual slotframe schedule according to the present invention.

FIG. 3 is a flowchart showing a method for generation and management of a virtual slotframe schedule according to the present invention.

With regard to generating a virtual slotframe by analyzing a traffic pattern, first, when a packet is received by the TSCH layer (S301), details are added to a packet transmission record list (S302), and a transmission cycle is performed on the packet by the transmission record analyzer 23 (S303).

The transmission record analyzer 23 analyzes a transmission record that represents a traffic pattern on the basis of the recorded list, and when a new transmission cycle (a new traffic pattern) is found (S304), generates a virtual slotframe schedule on the basis of the new transmission cycle (S305).

A link is generated for a virtual slotframe having a length that is suitable for the found transmission cycle, and a negotiation is conducted for the link with a target device through the 6Top layer (S306).

When the link is successfully generated (S307), the link is added to a virtual slotframe schedule table, and the packet transmission recorded having been used for the analysis is deleted (S308).

In addition, in order to adjust virtual slotframe schedule in the process of generating a virtual slotframe schedule by analyzing a traffic pattern according to the present invention, the packet reception predictor 25 performs the follow process.

First, when a packet is received by a TSCH layer (S301), a packet reception predictor 25 predicts a reception time of the packet through the traffic pattern (S311). When the prediction of reception is successful (S312), the packet reception predictor 25 increases a prediction accuracy value (S313) and determines whether the accuracy value is smaller than or equal to a maximum value (S314).

When the accuracy value is smaller than or equal to the maximum value, allocated resources are reduced (S315) and the virtual slotframe schedule is adjusted (S320).

When the reception prediction is unsuccessful (S312), the packet reception predictor 25 decreases the prediction accuracy value (S316) and determines whether the accuracy value is smaller than or equal to a minimum value (S317).

When the accuracy value is smaller than or equal to the minimum value, a virtual slotframe schedule is unallocated (S318) and the virtual slotframe schedule is adjusted (S320).

When the accuracy value is not smaller than or equal to a minimum value, allocated resources are increased (S319) and the virtual slotframe schedule is adjusted (S320).

An initially generated virtual slotframe schedule has an initial value regarding accuracy value, and in consideration of a possible error, a sufficient communication slot (over-provisioning) is allocated.

Depending on correctness of the prediction of the reception time of the packet, the traffic pattern prediction accuracy value is adjusted, and the allocation of slots is adjusted according to the accuracy value, and thus resources are conserved.

When the prediction accuracy value is higher, a communication is performed with a smaller amount of allocated resources.

However, when the accuracy value is lowered to a predetermined threshold value or below, the virtual slotframe schedule is discarded and a traffic pattern is newly predicted.

An added virtual slotframe schedule is converted and aggregated into a TSCH link schedule that is usable in the TSCH operator 27 by the schedule converter and aggregator at the start of each slot frame.

Figure 4:
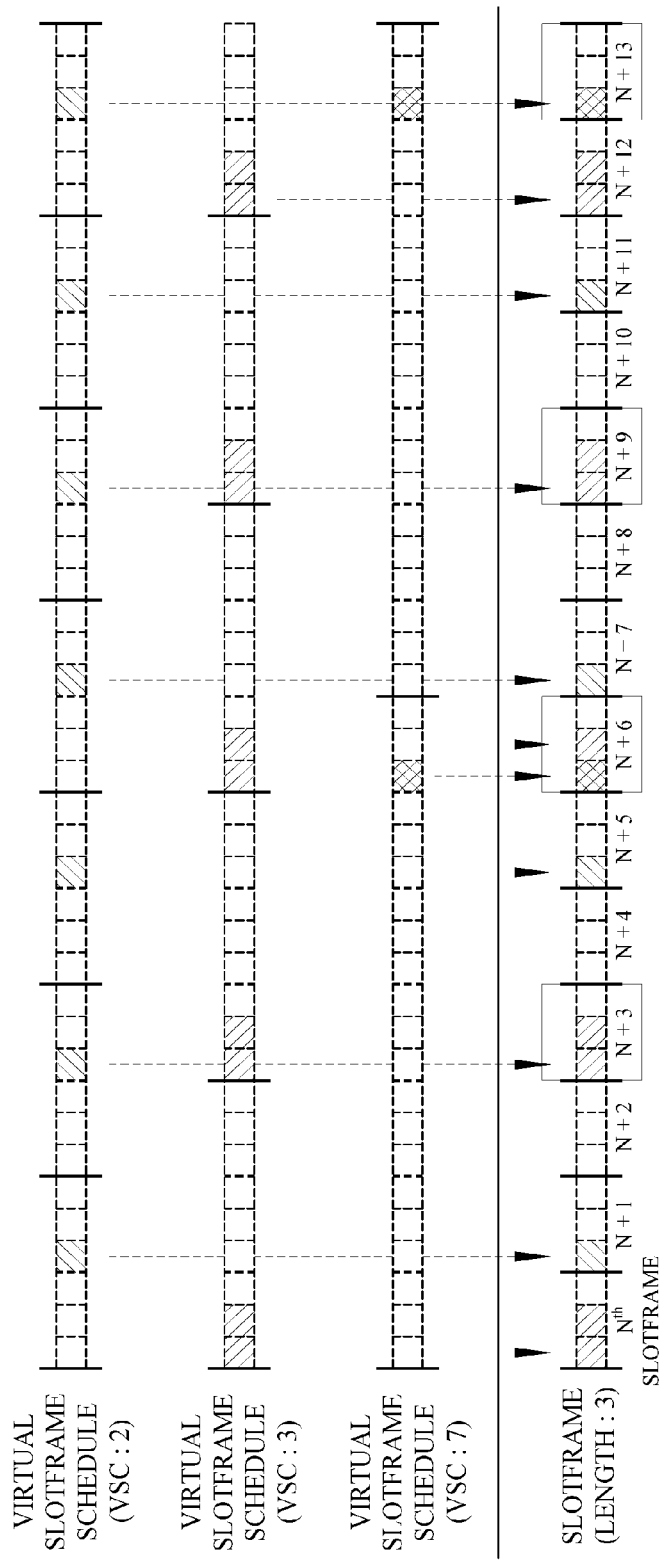
FIG. 4 is a structural view illustrating an example of conversion and aggregation of virtual slotframe schedules.

FIG. 4 is a structural view illustrating an example of conversion and aggregation of virtual slotframe schedules in the schedule converter and aggregator 26.

A virtual slotframe schedule generated on the basis of a traffic pattern of each application service does not exist in an actual TSCH communication, and thus needs to be converted.

To this end, at the start of each new slotframe (or the end of each slotframe), a conversion is performed on a virtual slotframe schedule included in a single next slotframe unit.

The virtual slotframe is composed as a multiple of an actual slotframe, and thus duplicate portions may occur as shown in slotframes N+3, N+6, N+9 and N+13.

In this case, the duplicate schedules need to be merged according to an aggregation rule, and an aggregation is performed with priority given to a schedule having a long virtual slotframe frame. Policies/rules for the aggregation may be applied differently depending on the situation.

Traffic of which a pattern is not analyzed by the transmission record analyzer 23 or traffic in which a loss occurs due to duplication needs to be transmitted through an additional schedule.

To this end, the transmission record analyzer 23 may predict a total amount of traffic that has not been classified or in which a loss will occur, and generate a schedule to be classified as a basic packet queue in FIG. 2.

Accordingly, all traffic generated from devices in the network can be handled.

A method of applying a virtual slotframe schedule to a TSCH communication flow is described below in detail.

Figure 5:
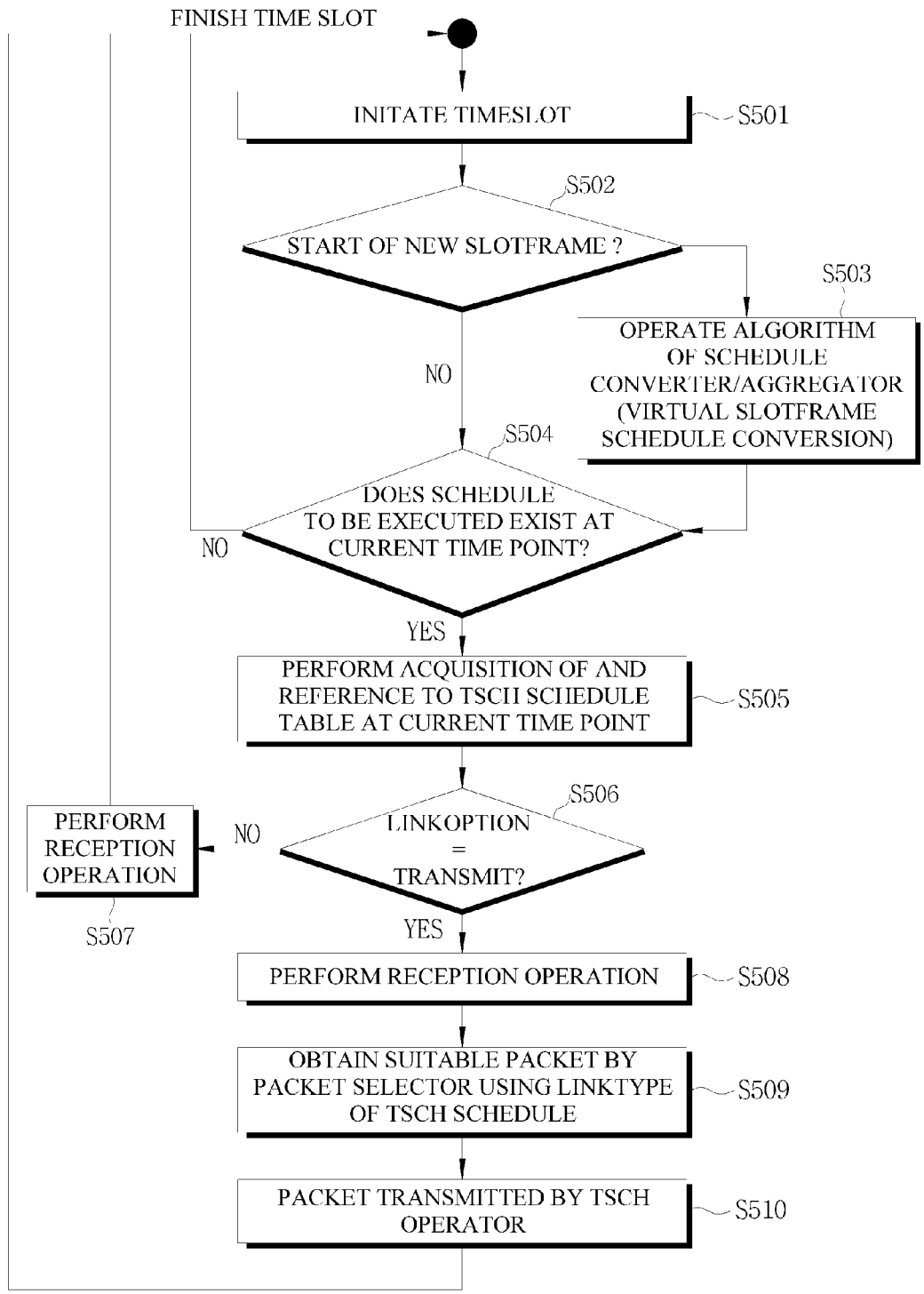
FIG. 5 is a flowchart showing a method of applying a virtual slotframe schedule to a TSCH communication flow.

FIG. 5 is a flowchart showing a method of applying a virtual slotframe schedule to a TSCH communication flow.

First, the TSCH initiates an operation on the basis of the start of a timeslot (S501).

It is determined whether the initiation of the operation is the start of a new slotframe (S502), a virtual slotframe schedule conversion is performed when the initiation of the operation is the start of a new slotframe (S503), and it is determined whether a schedule to be executed exists when the initiation of the operation is not the start of a new slotframe (S504).

When a schedule to be executed does not exist, the operation returns to a sleep state and waits for the next time slot to start while reducing energy consumption.

When a schedule to be executed exists, an operation is performed to be suitable for the schedule by referring to a TSCH schedule table in a current time slot (point in time) (S505).

The operation according to the schedule to be executed is classified as a sleep state, a transmission state, or a reception state in a LinkOption field.

While operating in the reception state, the reception of a packet is waited on, and the timeslot is finished when the reception is successful or Idle listening ends (S507).

While operating in the transmission state, the packet selector 22 obtains a suitable packet by using LinkType of a TSCH schedule (S508) by referring to LinkOption of the TSCH schedule table (S506), and the TSCH operator 27 receives the suitable packet from the packet selector 22 and transmits the packet (S509).

Then, the TSCH operator 27 updates a transmission result record table (S510).

In particular, at the start (or the end) of a slot frame, the schedule converter and aggregator 26 needs to operate such that a TSCH schedule for the next slotframe is generated.

The transmission record analyzer 23 and the virtual slotframe schedule generation manager 24 are executed substantially in parallel to each other in the latter part of the operation of the TSCH to generate a virtual slotframe schedule, and the schedule converter and aggregator 26 and the TSCH operator 27 operate in association with each other to convert and aggregate the generated virtual slotframe schedules.

As described above, in the apparatus and method using a virtual slotframe in an industrial wireless sensor network according to the present invention, devices on a network generate schedules that are efficient with regard to data traffic having various cycles on a network by performing scheduling in a distributed manner through a virtual slotframe scheme.

Through virtual slotframe technology, the present invention obviates the need to consider an influence on slotframe settings in the whole network, allows link scheduling to be performed at an appropriate slotframe level that is required by each application service, and enables data transmission with a significantly low latency.

As described above, it should be appreciated by those skilled in the art that changes and modifications are possible without departing from the scope and sprit of the disclosure.

Therefore, the embodiments disclosed above should be considered in a descriptive sense only and not for purposes of limitation, and the scope of the invention is defined not by the detailed description of the invention but by the appended claims, and encompasses all modifications and equivalents that fall within the scope of the appended claims and will be construed as being included in the present invention.

| [Reference Numerals] | |
|---|---|
| 21. packet classifier. | 22. packet selector |
| 23. transmission record analyzer | 24. virtual slotframe schedule generation manager |
| 25. packet reception predictor | 26. schedule converter and aggregator |
| 27. TSCH operator | |

What is claimed is:

1. A scheduling apparatus using a virtual slotframe in an industrial wireless sensor network, the scheduling apparatus comprising:
    a packet classifier configured to manage, in a list, a point in time when a packet is generated by referring to a packet transmission record;
    a transmission record analyzer configured to analyze a traffic pattern on the basis of a list indicating the point in time when the packet was generated;
    a virtual slotframe schedule generation manager configured to generate a virtual slotframe schedule according to the traffic pattern when the traffic pattern is classified;
    a schedule converter and aggregator configured to perform a conversion and an aggregation for a direct link schedule that is to be used for TSCH (Time Slotted Channel Hopping) operation; a virtual slotframe schedule adjustment operation configured to perform, when a packet is received by a TSCH layer, predict a reception time of the packet through the analyzed traffic pattern, and decrease or increase allocated resources on the basis of a schedule accuracy value; and
    a packet reception predictor configured to
        predict a reception time of the packet through the traffic pattern when the packet is received by the TSCH layer, and in response to successfully predicting the reception, increase the schedule accuracy value and determine whether the accuracy value is smaller than or equal to a maximum value,
        reduce the allocated resources when the accuracy value is smaller than or equal to the maximum value, and adjust the virtual slotframe schedule,
        decrease the schedule accuracy value in response to unsuccessfully predicting the reception, and determine whether the accuracy value is smaller than or equal to a minimum value, and
        unallocate the virtual slotframe schedule and adjust the virtual slotframe schedule when the accuracy value is smaller than or equal to the minimum value, and increase allocated resources and adjust the virtual slotframe schedule when the accuracy value is not smaller than or equal to the minimum value.

2. The scheduling apparatus of claim 1, further comprising a packet selector configured to select a packet when a time of transmission approaches according to the link schedule, and perform a transmission on the selected packet.

3. The scheduling apparatus of claim 1, wherein the packet reception predictor is configured to predict the reception time of the packet through the analyzed traffic pattern and deliver the predicted reception time of the packet to the virtual slotframe schedule generation manager,
wherein the packet reception predictor increases a prediction accuracy value or corrects a wrong prediction according to elapsed time.

4. The scheduling apparatus of claim 1, wherein, when the traffic pattern is successfully classified, the virtual slotframe schedule generation manager generates the virtual slotframe schedule that is suitable for a traffic pattern, and negotiates for the link schedule with a target device through a 6Top layer.

5. The scheduling apparatus of claim 1, wherein the schedule converter and aggregator manages, in a table, the virtual slotframe schedule that is generated through the negotiation with the target device.

6. A scheduling method using a virtual slotframe in an industrial wireless sensor network, the scheduling method comprising:
adding details to a packet transmission record list when a packet is received by a Time Slotted Channel Hopping (TSCH) layer, and analyzing a transmission cycle;
analyzing, by a transmission record analyzer, a transmission record that represents a traffic pattern on the basis of the recorded list, and when a new transmission cycle is found, generate a virtual slotframe schedule on the basis of the new transmission cycle;
generating a link for a virtual slotframe having a length that is suitable for the found transmission cycle, and performing a negotiation for the link with a target device through a 6Top layer;
adding the link to a virtual slotframe schedule table when the link is successfully generated; and
performing a virtual slotframe schedule adjustment operation of, when a packet is received by a TSCH layer, predicting a reception time of the packet through the analyzed traffic pattern, and decreasing or increasing allocated resources on the basis of a schedule accuracy value,
wherein the virtual slotframe schedule adjustment operation comprises:
predicting, by a packet reception predictor, a reception time of the packet through the traffic pattern when the packet is received by the TSCH layer, and in response to successfully predicting the reception, increasing the schedule accuracy value and determining whether the accuracy value is smaller than or equal to a maximum value;
reducing the allocated resources when the accuracy value is smaller than or equal to the maximum value, and adjusting the virtual slotframe schedule;
decreasing the schedule accuracy value in response to unsuccessfully predicting the reception, and determining whether the accuracy value is smaller than or equal to a minimum value; and
unallocating the virtual slotframe schedule and adjusting the virtual slotframe schedule when the accuracy value is smaller than or equal to the minimum value, and increasing allocated resources and adjusting the virtual slotframe schedule when the accuracy value is not smaller than or equal to the minimum value.

7. The scheduling method of claim 6, wherein the adding of the link to the virtual slotframe schedule table comprises deleting a packet transmission record that has been used for the analysis.

8. The scheduling method of claim 6, wherein the adding of the link to the virtual slotframe schedule table comprises converting and aggregating, by a schedule converter and aggregator, an added virtual slotframe schedule into a TSCH link schedule that is usable in a TSCH operator at the start of each slot frame.

9. The scheduling method of claim 6, wherein, when the schedule accuracy value is lowered to a predetermined threshold value or below, the virtual slotframe schedule is discarded and a traffic pattern is newly predicted.

10. The scheduling method of claim 6, wherein traffic of which a pattern is not analyzed by the transmission record analyzer or traffic in which a loss occurs due to duplication is transmitted through an additional schedule, and
the transmission record analyzer predicts a total amount of traffic that has not been classified or in which a loss will occur, and generates a schedule to be classified into a basic packet queue.

11. A scheduling method using a virtual slotframe in an industrial wireless sensor network, the scheduling method comprising, for applying a virtual slotframe schedule to a TSCH (Time Slotted Channel Hopping) communication flow:
initiating, by a TSCH, an operation on the basis of the start of a timeslot, and determining whether the initiation of the operation is the start of a new slotframe;
performing a virtual slotframe schedule conversion when the initiation of the operation is the start of a new slotframe, and determining whether a schedule to be executed exists when the initiation of the operation is not the start of a new slotframe;
performing an operation according to the schedule in a current time slot by referring to a TSCH schedule table when a schedule to be executed exists;
obtaining, by a packet selector, a suitable packet by using LinkType of a TSCH schedule by referring to LinkOption of a TSCH schedule table, receiving the packet, and transmitting the packet to a TSCH operator;
updating, by the TSCH operator, a transmission result record table; and
performing a virtual slotframe schedule adjustment operation of, when a packet is received by a TSCH layer, predicting a reception time of the packet through the analyzed traffic pattern, and decreasing or increasing allocated resources on the basis of a schedule accuracy value,
wherein the virtual slotframe schedule adjustment operation comprises:
predicting, by a packet reception predictor, a reception time of the packet through the traffic pattern when the packet is received by the TSCH layer, and in response to successfully predicting the reception, increasing the schedule accuracy value and determining whether the accuracy value is smaller than or equal to a maximum value;
reducing the allocated resources when the accuracy value is smaller than or equal to the maximum value, and adjusting the virtual slotframe schedule;
decreasing the schedule accuracy value in response to unsuccessfully predicting the reception, and determining whether the accuracy value is smaller than or equal to a minimum value; and unallocating the virtual slotframe schedule and adjusting the virtual slotframe schedule when the accuracy value is smaller than or equal to the minimum value, and increasing allocated resources and adjusting the virtual slotframe schedule when the accuracy value is not smaller than or equal to the minimum value.

12. The scheduling method of claim 11, wherein the determining of whether a schedule to be executed exists comprises returning to a sleep state and waiting for the next time slot to start while reducing energy consumption when a schedule to be executed does not exist.

13. The scheduling method of claim 11, wherein the operation according to the schedule to be executed is classified as a sleep state, a transmission state, or a reception state in a LinkOption field, further comprising, while operating in the reception state, waiting for a packet to be received, and finishing a timeslot when the reception is successful or Idle listening ends.

* * * * *